(12) United States Patent
Boulos et al.

(10) Patent No.: US 10,025,571 B1
(45) Date of Patent: Jul. 17, 2018

(54) OPTIMIZED EXECUTION OF DYNAMIC LANGUAGES

(71) Applicant: Google Inc., Mountain View, CA (US)

(72) Inventors: Solomon Boulos, San Francisco, CA (US); Jeremy Sugerman, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 150 days.

(21) Appl. No.: 14/334,582

(22) Filed: Jul. 17, 2014

(51) Int. Cl.
*G06F 8/41* (2018.01)

(52) U.S. Cl.
CPC .................................. *G06F 8/443* (2013.01)

(58) Field of Classification Search
CPC ............................................. G06F 8/443
See application file for complete search history.

(56) References Cited

U.S. PATENT DOCUMENTS

| | | | |
|---|---|---|---|
| 5,530,964 A | 6/1996 | Alpert et al. | |
| 5,999,732 A | 12/1999 | Bak et al. | |
| 6,651,248 B1 | 11/2003 | Alpern | |
| 7,389,317 B2 | 6/2008 | Guttag et al. | |
| 7,437,718 B2 | 10/2008 | Fournet et al. | |
| 7,493,610 B1 * | 2/2009 | Onodera | G06F 8/49 714/38.14 |
| 7,917,898 B2 | 3/2011 | Zhao et al. | |
| 8,095,507 B2 | 1/2012 | Wu et al. | |
| 8,244,775 B1 | 8/2012 | Bak et al. | |
| 8,392,881 B1 | 3/2013 | Lund et al. | |
| 9,104,449 B2 | 8/2015 | Boulos et al. | |
| 2003/0110470 A1 * | 6/2003 | Hanson | G06F 8/31 717/114 |
| 2005/0204361 A1 | 9/2005 | Heeb | |
| 2006/0085400 A1 | 4/2006 | Minore et al. | |
| 2006/0242654 A1 | 10/2006 | Lund et al. | |
| 2006/0294528 A1 | 12/2006 | Lund et al. | |
| 2007/0234288 A1 * | 10/2007 | Lindsey | G06F 8/437 717/117 |

(Continued)

OTHER PUBLICATIONS

Madhukar, et al., "Improved type specialization for dynamic scripting languages," ACM Sigplan Notices, Feb. 2014, vol. 49, No. 2, pp. 37-48.

(Continued)

*Primary Examiner* — Li B Zhen
*Assistant Examiner* — Amir Soltanzadeh
(74) *Attorney, Agent, or Firm* — McDermott Will & Emery LLP (57) ABSTRACT

In one aspect, a method includes receiving a code block including one or more variables, performing forward data flow analysis for the code block including generating a control flow graph of the code block and for each operation in the control flow graph determining if the operation provides an update regarding the type of one or more of the operations or variables of the code block, the update being based on one or more rules of type inference, updating a type set of each of the operations or variables where the operation provides an update regarding the type, determining if the operation provides an update regarding the location of the variables, the update being based on one or more rules of location inference and updating a location set of each of the variables where the operation provides an update regarding the location set.

18 Claims, 6 Drawing Sheets

(56) References Cited

U.S. PATENT DOCUMENTS

| | | | |
|---|---|---|---|
| 2008/0313604 A1* | 12/2008 | Cowtan | G06F 8/44 |
| | | | 717/106 |
| 2009/0307430 A1 | 12/2009 | Bruening et al. | |
| 2010/0083219 A1 | 4/2010 | Tavares et al. | |
| 2010/0095284 A1 | 4/2010 | Herring et al. | |
| 2011/0131556 A1 | 6/2011 | Tatsubori | |
| 2011/0145423 A1 | 6/2011 | Burns et al. | |
| 2011/0179347 A1 | 7/2011 | Proctor et al. | |
| 2011/0321010 A1 | 12/2011 | Wang | |
| 2012/0054725 A1 | 3/2012 | Inglis et al. | |
| 2012/0311307 A1 | 12/2012 | Chynoweth et al. | |
| 2013/0159978 A1 | 6/2013 | Jazdzewski et al. | |
| 2013/0339936 A1 | 12/2013 | Boulos | |
| 2014/0007060 A1 | 1/2014 | Warren et al. | |
| 2014/0123118 A1* | 5/2014 | Goetz | G06F 11/3672 |
| | | | 717/140 |
| 2014/0173556 A1 | 6/2014 | Robatmili et al. | |
| 2014/0173573 A1 | 6/2014 | Chase | |
| 2014/0282443 A1* | 9/2014 | Hoban | G06F 8/437 |
| | | | 717/143 |
| 2016/0019035 A1 | 1/2016 | Boulos et al. | |
| 2016/0179489 A1 | 6/2016 | Boulos et al. | |

OTHER PUBLICATIONS

"Is the call-stack in RAM? Where's the heap (free store)?" Aug. 2015, 2 pages, retrieved from https://www.quora.com/Is-the-call-stack-in-RAM-wheres-the-heap-free-store.

European Office Action dated Feb. 24, 2017, which issued in European Application No. 13807775.5.

Hölzle et al., "Optimizing Dynamically-Typed Object-Oriented Languages With Polymorphic Inline Caches," Published in ECOOP '91 Proceedings, Springer Verlag Lecture Notes in Computer Science 512, Jul. 1991, 18 pages.

* cited by examiner

OPTIMIZED EXECUTION OF DYNAMIC LANGUAGES

BACKGROUND

Dynamic languages such as PHP: Hypertext Preprocessor (PHP), Python, Ruby, and Perl have been adopted heavily for web and application development because they allow for high developer productivity due to their flexibility in comparison to static languages such as C, Java, or C++. However, this flexibility typically leads to significantly slower execution of these languages over static languages.

SUMMARY

The disclosed subject matter relates to a machine-implemented method including receiving a first code block, the first code block including one or more variables. The method further including generating a control flow graph of the code block, the control flow graph including one or more operations. The method further including performing forward data flow analysis for the code block. The forward data flow analysis including for each operation in the control flow graph, determining if the operation provides an update regarding the type of one or more of the one or more operations or one or more variables, the update being based on one or more rules of type inference, and updating the type set of each of the one or more of the one or more operations or one or more variables where the operation provides an update regarding the type. The method further including returning the type set for one or more of the one or more operations or one or more variables of the code block determined in response to the forward data flow analysis, wherein the type set of an operation or variable defines the possible types for the operation or variable. Other aspects can be embodied in corresponding systems and apparatus, including computer program products.

The disclosed subject matter also relates to a system including one or more processors a machine-readable medium comprising instructions stored therein, which when executed by the processors, cause the processors to perform operations including generating a control flow graph of the code block, the control flow graph comprising one or more operations. The operations further including performing forward data flow analysis for a code block including one or more variables until the data flow analysis converges. The forward data flow analysis including for each operation in the control flow graph determining if the operation provides an update regarding the type of one or more of the one or more operations or one or more variables, the update being based on one or more rules of type inference, updating a type set of each of the one or more of the one or more operations or one or more variables where the operation provides an update regarding the type, determining if the operation provides an update regarding the location of the one or more variables, the update being based on one or more rules of location inference and updating a location set of each of the one or more variables where the operation provides an update regarding the location. The operations further including storing the type sets and location sets generated in response to the forward data flow analysis with respect to the code block. Other aspects can be embodied in corresponding systems and apparatus, including computer program products.

The disclosed subject matter also relates to a machine-readable medium including instructions stored therein, which when executed by a machine, cause the machine to perform operations including receiving a first code block, the first code block including one or more variables. The operations further including generating a control flow graph of the code block including one or more operations. The operations further including performing forward data flow analysis for the code block, the forward data flow analysis including for each operation in the control flow graph determining if the operation provides an update regarding the type of one or more of the one or more operations or one or more variables, the update being based on one or more rules of type inference, updating a type set of each of the one or more of the one or more operations or one or more variables where the operation provides an update regarding the type, determining if the operation provides an update regarding the location of the one or more variables, the update being based on one or more rules of location inference and updating a location set of each of the one or more variables where the operation provides an update regarding the location set. Other aspects can be embodied in corresponding systems and apparatus, including computer program products.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

Dynamic languages allow for more flexibility due to their dynamic nature. Several features of dynamic languages contribute to their productive characteristics. For example, these languages allow for runtime typing and the ability to evaluate new data as code dynamically (e.g., "eval" in PHP and JavaScript). These characteristics allow developers to write code that can be used more flexibly than static code written in static languages such as C, Java, or C++. For example, the dynamic languages enable more flexible development practices by allowing developers to conditionally generate new executable code from existing code at runtime to handle novel data.

Typically the execution of these languages is significantly slower than that of static languages because the types of variables and functions and full scope of executable code for dynamic languages is not known by the compiler.

Static languages may enforce compile time static typing and may not allow dynamic code execution. For these static languages, the types of functions and variables are typically known at compile time, and the full scope of executable code is usually known by the compiler. Accordingly, a static language can be translated to machine code efficiently prior to a program's execution.

In the case of a dynamic language, the full scope of the executable code is not known, and the types of many functions and variables may not be known until the moment the code is executed. For these reasons a dynamic language cannot be completely converted to machine code prior to execution. In addition, even runtime translation to machine code is often impractical for these dynamic languages because the just-in-time compilation process may itself require significant execution resources leading to diminished performance during execution. Accordingly, generating machine code efficiently prior to execution is often difficult. The need for significant execution resources for machine code translation during runtime leads to diminished performance during execution.

To facilitate more optimized machine code generation and runtime execution, methods and systems are provided for facilitating generation of specialized intermediate representation ("IR") of code through type and location inferences. In one example, for each code block (e.g., a file, function, subfunction, statement, etc.), forward data flow analysis may be performed to determine type set and/or location set inferences for expressions within the code block.

To generate optimized IR, for a code block, forward data analysis is performed to determine type set and location set inferences for variables and/or expressions within the code block. In one examples, a control flow graph (CFG) is generated for the code block. The CFG generates one or more basic blocks each comprising a set of operations. Each basic block represents a straight-line portion of the code block without any jumps or jump targets. Some operations may include one or more variables. In another example, an operation may not include a variable. The CFG may be used to infer a type and/or location set for one or more operations and/or variables of the CFG.

In one example, forward dataflow analysis traverses all paths within the CFG to generate type set and location set inferences. Type flowing includes determining, if the type of the operation and/or variables within the operation can be inferred through forward dataflow analysis.

The type set and/or location set for each operation and/or variable may be set to undefined at the beginning of the forward flow analysis. Next, each operation of the CFG is analyzed to determine if types for the operation or one or more variables within the operation may be reduced to one or more known types (a "type set"). Additionally, for all variables, the location set is set to undefined. Next, the CFG is traversed to determine if location inferences may be made for the variable. If so, the type set and/or location set for the operation and/or variable(s) is updated. In one example, the forward dataflow analyses runs until convergence which occurs when the input states to all basic blocks of the CFG no longer change.

In some examples, for each function, a type set of the arguments and return variables for the function may be generated. Similarly, a type set may be generated for an operation (e.g., each operation or sub operation of the CFG). In one example, a type set for an operation may be generated when there are no variables involved in the operation (e.g., a string operation). Still further, a type set may be generated for each variable (e.g., variables used in the operation and/or function). The type set for each variable and/or operation may include a single type or a set of possible types. The knowledge of types for each operation and/or variable facilitates specialized machine code to be generated, thus leading to much faster runtime execution of code written in a dynamic language.

Location inferences may similarly facilitate generating more efficient machine code. In some examples, the location of results of an operation (e.g., results of an operation) within a code block is inherently local and thus no inference regarding location of operation results is necessary. In some implementations, the possible locations for each variable within a code block (e.g., variables of an operation and/or variables returned by a function) are inferred and a location set is generated for each variable.

In some examples, location set inference for a variable may include determining the scope of the variable. For example, whether the variable is a local variable, a global variable, an instance variable, a class variable, a constant, an argument, etc. In some examples, Location set inference for each variable may include determining how optimally to represent the type of storage for a variable and/or access the backing store for a variable at runtime. For example, type of storages for a variable may include stack based, heap based, global heap, constant, etc. Access types for a variable may include statically resolving the address during compile-time, semi-statically resolving the addresses with occasional feedback to dynamic lookup, dynamically resolving with pre-computation, fully dynamically resolve by name, etc.

Type set and/or location set inferences may be performed according to various sources of type and location information including signature of builtins (e.g., defined return types), return types computed for user functions, argument types from call-time function specialization and rules of the language (e.g., certain operations always return certain types).

Accordingly, type and location inferences are made for blocks of code using forward data flow analysis such that more specialized intermediate representation of the code is generated and more optimized generation and execution of machine code at runtime is made possible.

Figure 1:
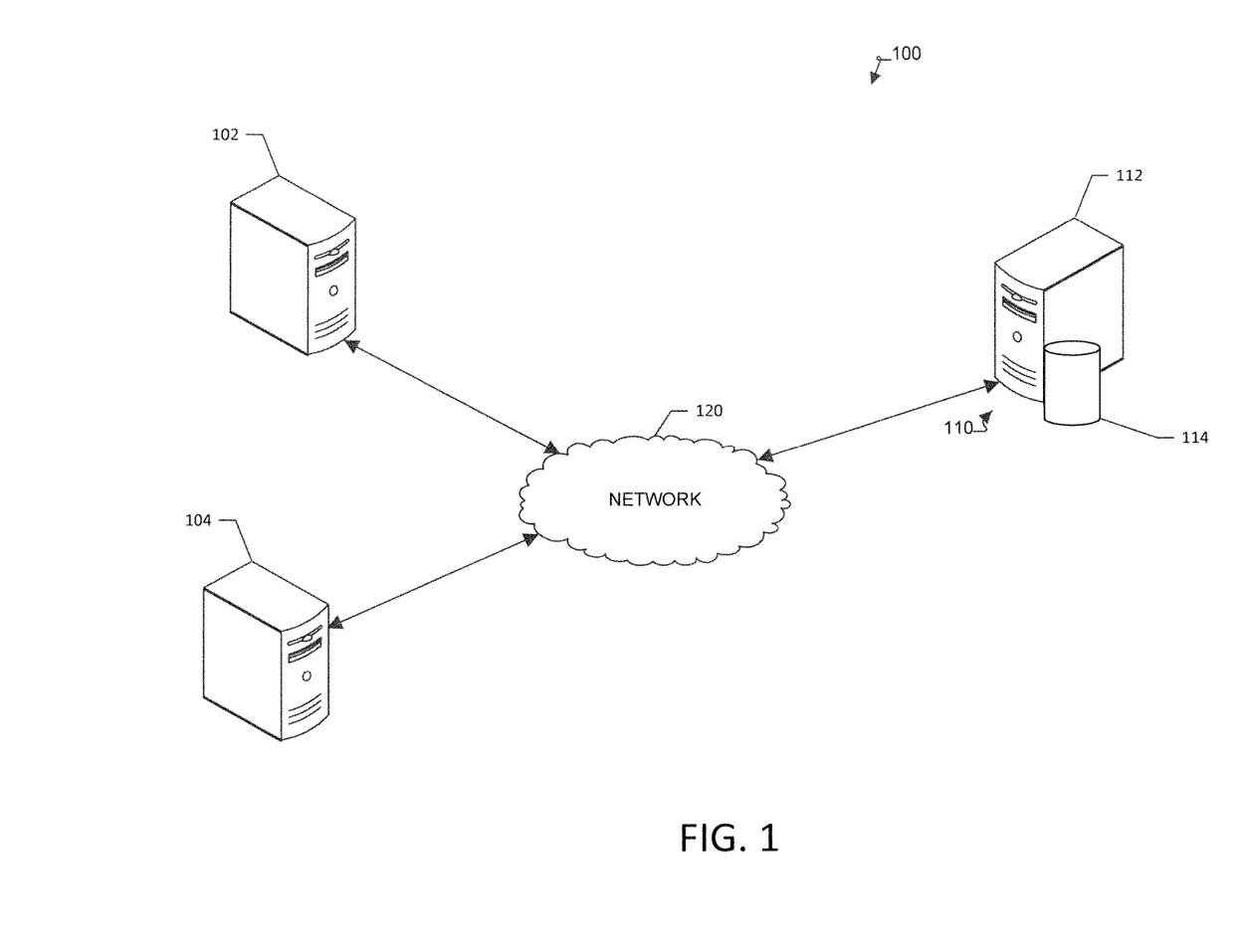
FIG. 1 illustrates an example client-server network environment, which provides for performing type and location analysis to facilitate optimized generation of machine code at runtime.

FIG. 1 illustrates an example client-server network environment, which provides for performing type and location analysis to facilitate optimized generation of machine code at runtime. The network environment 100 includes a number of clients 102 and 104 communicably connected to an application server 110.

Figure 2:
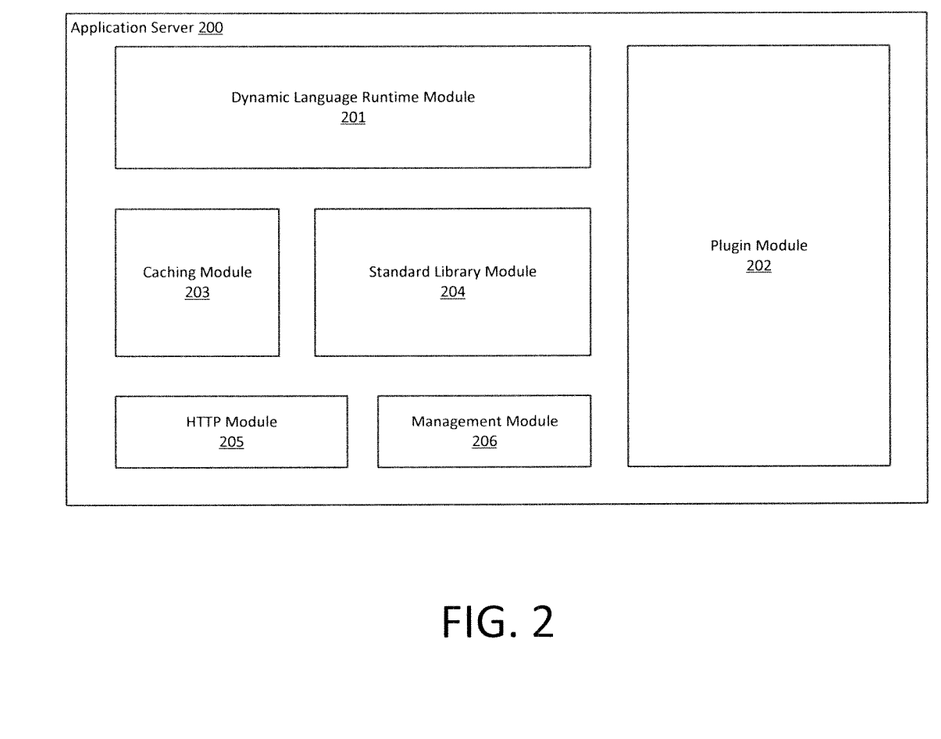
FIG. 2 illustrates an example application server for use in performing type and location analysis to facilitate optimized generation of machine code at runtime.

According to some aspects, application server 110 can be any system or device having a processor, a memory and communications capability for facilitating optimized generation of machine code at runtime. FIG. 2, described in more detail below, illustrates an example application server.

In some example implementations, clients 102 and 104 can be any client issuing web requests to the application server 110. In the example of FIG. 1, client 102 may be a mobile client and client 104 may be a browser client (e.g., web browser). Communications between the clients 102 and 104 and server 110 may be facilitated through various communication protocols (e.g., the HTTP protocol).

In one example, the communication between application server 110 and clients 102 and 104 may be through a network 120. Network 120 can be a public communication network (e.g., the Internet, cellular data network, dialup modems over a telephone network) or a private communications network (e.g., private LAN, leased lines). The network 120 can include, for example, any one or more of a personal area network (PAN), a local area network (LAN), a campus area network (CAN), a metropolitan area network (MAN), a wide area network (WAN), a broadband network (BBN), the Internet, and the like. Further, the network 120 can include, but is not limited to, any one or more of the following network topologies, including a bus network, a star network, a ring network, a mesh network, a star-bus network, tree or hierarchical network, and the like. Further, network 120 can include, but is not limited to, any one or more of the following network topologies, including a bus network, a star network, a ring network, a mesh network, a star-bus network, a tree or hierarchical network, and the like.

FIG. 2 illustrates an example application server 200 for use in performing type and location analysis to facilitate optimized generation of machine code at runtime. In one example, the application server 200 may be used as the application server 110 described above with respect to FIG. 1. In some implementations, application server 200 includes a dynamic language runtime module 201, a plugins module 202, a caching module 203, a standard library module 204, an http module 205 and a management module 206.

Runtime module 201 includes logic for facilitating optimized generation of machine code at runtime. In one example, runtime module 201 includes logic for generating specialized IR.

In one example, the plugins module 202 includes a memory for storing a set of dynamic language plugins for use during code generation and/or runtime execution. In one example, plugins stored within the plugin module 201 may, for example, provide extensions and/or additional functionality to the dynamic language. For example, the plugins may include plugins for communicating with databases such as SQL or SQL server, and/or plugins for parsing XML, and other extended functionality.

Caching module 203 facilitates storing data for facilitating optimized generation of machine code at runtime. For example, caching module 203 may include memory for storing type set and/or location sets for one or more functions, operations and/or variables generated according to various methods and processes described herein. In one example, caching module 203 may further facilitate storing per request and/or across request information for facilitating optimized generation of machine code at runtime (e.g., a page request).

Standard library module 204 may store one or more predefined functions and/or operations for the dynamic language. In one example, the standard library module 204 includes memory for storing a wide range of built-in modules that provide access to system functionality, as well as modules that provide standardized solutions (e.g., built-in operations). For example, in some examples, the modules may provide abstractions of existing core language to provide platform neutrality.

In some examples, HTTP module 205 may include logic for responding to requests from one or more clients (e.g., clients 102 and/or 104). For example, HTTP module 205 may include logic for responding to requests for webpages. The logic may include logic for setting up a connection, communicating with one or more clients for accessing request from and/or responding to clients, etc. The HTTP module may further include information such as HTTP error codes and/or other information for communicating with one or more clients via the HTTP protocol.

Management module 206 provides operations and/or developer functionality. For example, the management module 206 may store one or more debuggers, profilers, stat counters, loggers, etc.

Figure 3:
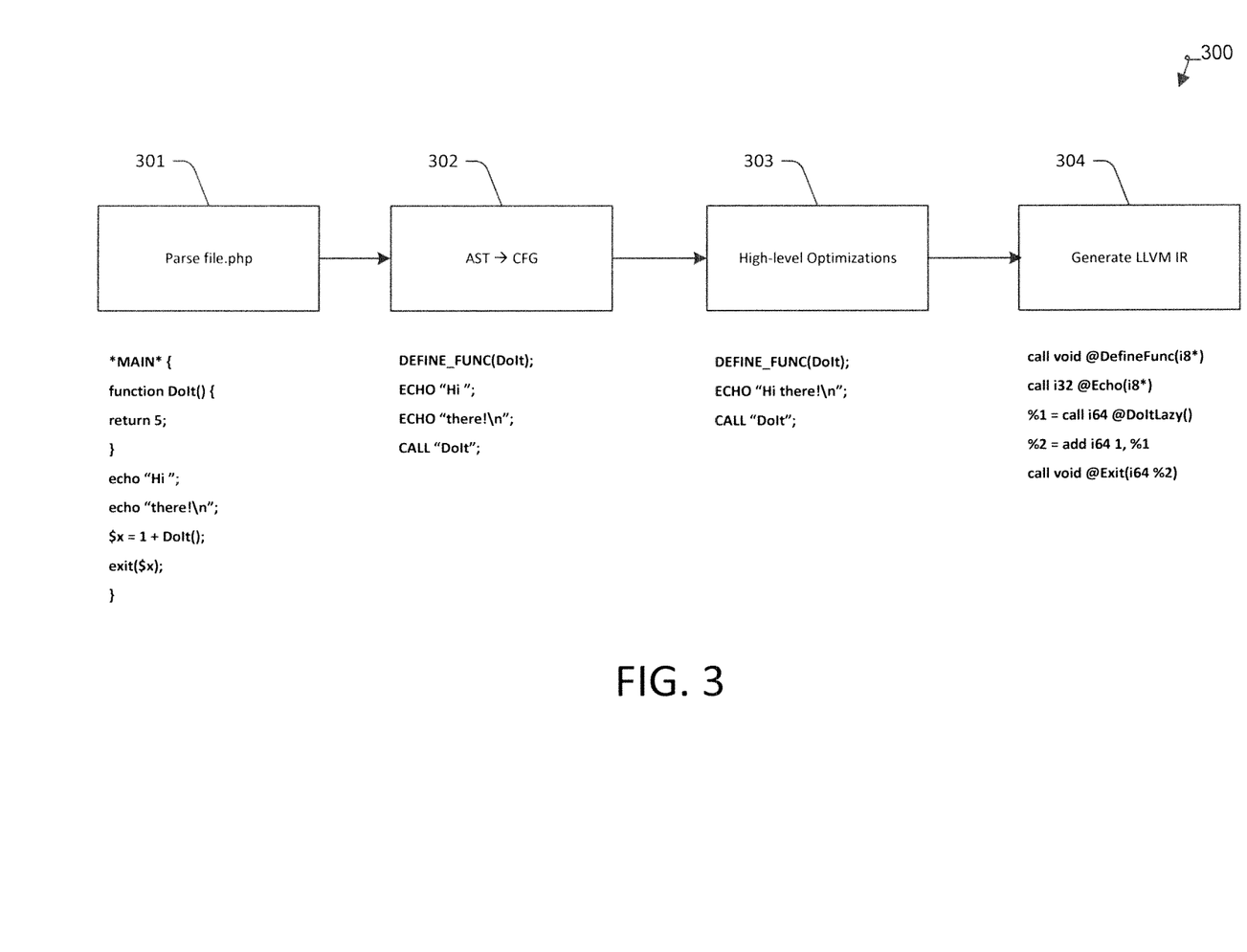
FIG. 3 illustrates a flow diagram of an example process for generating IR from a PHP code block (e.g., a file).

FIG. 3 illustrates a flow diagram of an example process 300 for generating IR from a PHP code block (e.g., a file). The use of PHP is for exemplary purposes. While the example flow diagram illustrates a PHP file, it should be understood by one of ordinary skill in the art that same or similar steps may represent generation of IR for other dynamic languages.

As shown in block 301, a code block (e.g., file) is first parsed. Here, the code block file.php is illustrated as being parsed. Parsing the code block results in generating a CFG as shown in block 302. High level optimizations are next performed on the CFG as shown in block 303 (e.g., combining ECHO "Hi" and ECHO "there!\n" into ECHO "Hi there!\n"). Next, in block 304, LLVM IR is generated from the optimized CFG. In some examples, in addition to high level optimizations of the CFG, other processes may be performed to optimize generation of IR. For example, type set and location set inferences may be performed according to processes described herein to optimize generation of IR (e.g., to allow for specialized IR based on specific types and locations of expressions with a code block such as file.php). Additionally, specialization or partial specialization of code (e.g., based on type or location inferences) may be performed. Once IR is generated, further optimizations (e.g., standard and/or traditional compiler optimizations) may be performed at the IR level.

In some examples caching may be performed to avoid re-compilation of a code block both at the file and/or function level, so that code generation need not be duplicated. In one example, one or more tables are generated to keep track of previously compiled files, functions, etc. The table(s), may be inserted into cache (e.g., within caching module 203).

For example, in the present example, the system may determine if file.php was previously compiled into machine code (e.g., stored within caching module 203) and has not been modified since. If so, the compiled machine code may be accessed and executed. Otherwise, the file is compiled (or re-compiled) and the compiled file may be stored within the cache (e.g., within a file table within the cache module 203). Similarly, the system may determine if the function DoIt( ) within the file.php has been previously compiled and has not been modified since. If so, the compiled machine code is accessed and executed. Otherwise, the function is compiled (or re-compiled) and the compiled function may be stored within the cache (e.g., within a file table within the cache module 203).

Figure 4:
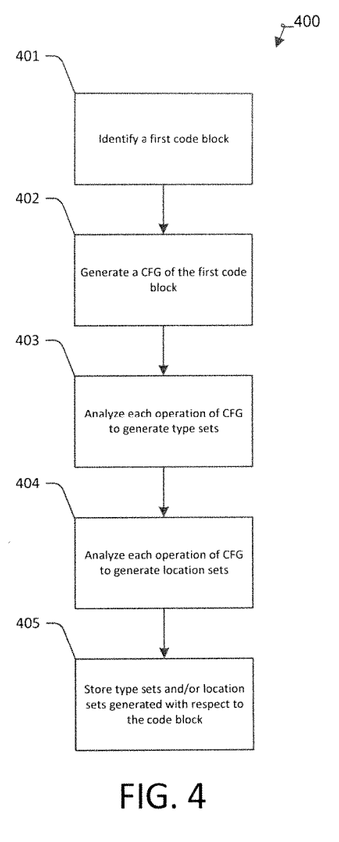
FIG. 4 illustrates a flow diagram of an example process for performing type and location analysis to facilitate optimized generation of machine code at runtime.

FIG. 4 illustrates a flow diagram of an example process 400 for performing type and location analysis to facilitate optimized generation of machine code at runtime. In step

401, a first code block is identified. For example, a code block may comprise a function, sub function or other portion of code, including one or more operations.

In step 402, a CFG for the code block is generated. In one example, the CFG of the code block generates a set of operations, representing all paths that may be traversed by the code block during its execution.

In step 403, each operation of the CFG is analyzed to generated type sets for one or more operations or variables. The type set for each operation and/or variable may be set to undefined at the beginning of the block. Next, each operation of the CFG is analyzed to determine if types for the operation or one or more variables within the operation may be reduced to one or more known types (a "type set"). For each operation within the CFG type analysis is performed, when possible, to infer the resulting type of the operation and/or one or more variables.

For example, assuming that the code block consists of a simple function as follows:

```
function Locals( ) {
$x=10;
$x+=5.3;
$y=$x<<1;
$x="foo";
$z=$x<<2;
}
```

In one example, a CFG block may be generated for the function Locals( ), as follows:

```
%0 L=VARIABLE($x ($0), #0)
ASSIGN<=>(%0, 10)
%1 L=VARIABLE($x ($0), #1)
%2 R=ASSIGN<+>(%1, 5.3)
%3 L=VARIABLE($y ($1), #2)
%4 R=VARIABLE($x ($0), #3)
%5 R=BINOP<<< >(%4, 1)
ASSIGN<=>(%3, %5)
%6 L=VARIABLE($x ($0), #4)
ASSIGN<=>(%6, "foo")
%7 L=VARIABLE($z ($2), #5)
%8 R=VARIABLE($x ($0), #6)
%9 R=BINOP<<< >(%8, 2)
ASSIGN<=>(%7, %9)
RETURN
```

Next, in some examples, the type set for all variables and operations within the CFG may be set to null and forward data flow analysis of the CFG is performed by stepping through each operation of the CFG (top-to-bottom) as follows:

```
%0 L= VARIABLE($x ($0), #0)     => %0 => {Null}
ASSIGN<=>(%0, 10)               => %0/$x => {Int}
%1 L= VARIABLE($x ($0), #1)     => %1 => {Int}
%2 R= ASSIGN<+>(%1, 5.3)        => %2/$x => {Float}
%3 L= VARIABLE($y ($1), #2)     => %3 => {Null}
%4 R= VARIABLE($x ($0), #3)     => %4 => {Float}
%5 R= BINOP<<<>(%4, 1)          => %5 => {Int}
ASSIGN<=>(%3, %5)               => %3/$y => {Int}
%6 L= VARIABLE($x ($0), #4)     => %6 => {Float}
ASSIGN<=>(%6, "foo")            => %6/$x => {CStr}
%7 L= VARIABLE($z ($2), #5)     => %7 => {Null}
%8 R= VARIABLE($x ($0), #6)     => %8/$x => {CStr}
%9 R= BINOP<<<>(%8, 2)          => %9 => {Int}
ASSIGN<=>(%7, %9)               => %7/$z => {Int}
RETURN
```

Since, in this example, the CFG for the function Locals( ) is a single block, once all operations of the CFG are completed, the process ends. The results of the forward data flow analysis may be stored (e.g., in a cache) for reference during generation of the IR.

As another example, the code block may comprise the function Loop( ) as follows:

```
function Loop( ) {
$n=100;
for ($i=0; $i<$n; $i++) {$sum+=$i;}
return $sum;
}
```

Figure 5:
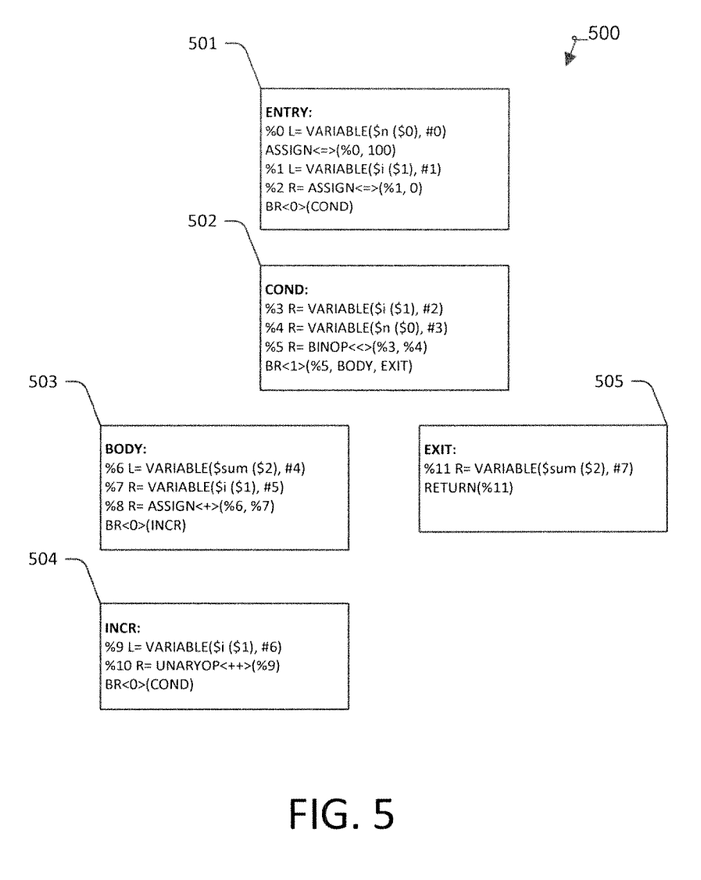
FIG. 5 illustrates an example CFG of a function in graphical form.

In one example, a CFG may be generated for the function Loop( ). FIG. 5 illustrates an example CFG 500 of function Loop( ) in graphical form. As shown in FIG. 5, the CFG 500 includes 5 basic blocks, ENTRY block 501, COND block 502, BODY block 503, INCR block 504 and EXIT block 505, including one or more operations, as follows:

```
ENTRY:
%0 L=VARIABLE($n ($0), #0)
ASSIGN<=>(%0, 100)
%1 L=VARIABLE($i ($1), #1)
%2 R=ASSIGN<=>(%1, 1)
BR<0>(COND)
COND:
%3 R=VARIABLE($i ($1), #2)
%4 R=VARIABLE($n ($0), #3)
%5 R=BINOP<< >(%3, %4)
BR<1>(%5, BODY, EXIT)
BODY:
%6 L=VARIABLE($sum ($2), #4)
%7 R=VARIABLE($i ($1), #5)
%8 R=ASSIGN<+>(%6, %7)
BR<0>(INCR)
INCR:
%9 L=VARIABLE($i ($1), #6)
%10 R=UNARYOP<++>(%9)
BR<0>(COND)
EXIT:
%11 R=VARIABLE($sum ($2), #7)
RETURN(%11)
```

Similar to function Locals( ), type analysis for Loop( ) proceeds from top-to-bottom. However, because there are multiple blocks, the type analysis algorithm may take into account the entry and exit state of all the variables ($n, $i, and $sum) (or other expressions that persist through blocks) between each block. As with all forward dataflow analyses, the algorithm runs until convergence (i.e. until the input states to all blocks no longer changes).

In one example, at the start of the process, the type set for all variables is set to undefined. The type analysis next begins at the ENTRY block (block 501 of FIG. 5), as follows:

```
Input: $n => {Undef}, $i => {Undef}, $sum => {Undef}
ENTRY:

%0 L= VARIABLE($n ($0), #0) => %0       => {Null}
ASSIGN<=>(%0, 100)                      => %0/$n => {Int}
%1 L= VARIABLE($i ($1), #1)             => %1 => {Null}
%2 R= ASSIGN<=>(%1, 0)                  => %2/$i => {Int}
BR<0>(COND)
OUTPUT: $n => {Int}, $i => {Int}, $sum => {Undef}
```

At the end of the entry block, the type for the variables $n and $i is set to int, and $sum remains undefined.

The process next proceeds to the next block of CFG. Following the unconditional branch, the COND block (block 502 of FIG. 5) is processed with the output from ENTRY. The type analysis then proceeds as follows:

```
Input: $n => {Int}, $i => {Int}, $sum => {Undef}
COND:

%3 R= VARIABLE($i ($1), #2)      => %3 => {Int}
%4 R= VARIABLE($n ($0), #3)      => %4 => {Int}
%5 R= BINOP<<>(%3, %4)           => %5 => {Bool}
BR<1>(%5, BODY, EXIT)
OUTPUT: $n => {Int}, $i => {Int}, $sum => {Undef}
```

Next, both BODY block (block 503 of FIG. 5) (e.g., following the scenario that the condition is met) and EXIT block (block 505 of FIG. 5) (e.g., following the scenario that the condition is not met) are processed with the new type information from the COND block, as follows:

```
Input: $n => {Int}, $i => {Int}, $sum => {Undef}
BODY:

%6 L= VARIABLE($sum ($2), #4)    => %6 => {Null}
%7 R= VARIABLE($i ($1), #5)      => %7 => {Int}
%8 R= ASSIGN<+>(%6, %7)          => %8/$sum => {Int}
BR<0>(INCR)
Output: $n => {Int}, $i => {Int}, $sum => {Int}
Input: $n => {Int}, $i => {Int}, $sum => {Undef}
EXIT:

%11 R= VARIABLE($sum ($2), #7)   => %11 => {Null}
RETURN(%11)
```

Next, following the branch, INCR block (block 504) is re-flowed with the new type information ($sum is now Int, instead of Undef).

```
Input: $n => {Int}, $i => {Int}, $sum => {Int}
INCR:

%9 L= VARIABLE($i ($1), #6)      => %9 => {Int}
%10 R= UNARYOP<++>(%9)           => %10 => {Int}
BR<0>(COND)
Output: $n => {Int}, $i => {Int}, $sum => {Int}
``` which then flows back into COND block (block 502), merging the two sets of Input information:

```
Input: $n => {Int}, $i => {Int}, $sum => {Int, Undef}
COND:

%3 R= VARIABLE($i ($1), #2)      => %3 => {Int}
%4 R= VARIABLE($n ($0), #3)      => %4 => {Int}
%5 R= BINOP<<>(%3, %4)           => %5 => {Bool}
BR<1>(%5, BODY, EXIT)
Output: $n => {Int}, $i => {Int}, $sum => {Int, Undef}
``` and back into BODY block (block 503) (and EXIT block (block 505)):

```
Input: $n => {Int}, $i => {Int}, $sum => {Int, Undef}
BODY:

%6 L= VARIABLE($sum ($2), #4)    => %6 => {Int, Null}
%7 R= VARIABLE($i ($1), #5)      => %7 => {Int}
%8 R= ASSIGN<+>(%6, %7)          => %8/$sum => {Int}
BR<0>(INCR)
Output: $n => {Int}, $i => {Int}, $sum => {Int}
```

At this stage in the forward dataflow analysis it may be observed that the output from BODY block (block 503) does not change (all three variables are Int). Thus, it is concluded that the iteration has converged and thus INCR block (block 504) is not enqueued for re-flowing (there's no new information). Finally, the EXIT block (block 505) (enqueued previously) is processed:

```
Input: $n => {Int}, $i => {Int}, $sum => {Int, Undef}
EXIT:

%11 R= VARIABLE($sum ($2), #7)   => %11 => {Int, Null}
RETURN(%11)
``` and the forward data flow analysis process concludes.

Type set inferences may be performed according to various sources of type information including signature of builtins (e.g., defined return types), return types computed for user functions, argument types from call-time function specialization and rules of the language (e.g., certain operations always return certain types). The above examples, illustrate type inferences according to rules of the language. In yet another example, type inference for one of more operations of a code block may be performed according to known function return types. Function return types may be determined by performing type inference for a function (e.g., as illustrated in the above examples) and storing the type inference information for the function in a function table (e.g., within a cache). In another example, known function types may be determined based on signature of builtins, or other sources of type information.

In one example, the code block may include the following:

function Helper( ) {return "foo";}
function ReturnTypes( ) {
$x=getrandmax( );
$y[$x]=10;
$z=array_keys($y);
$z[$x]=1.5;
$z[0]=1.3;
$w=Helper( );
}

For the function ReturnTypes( ) a CFG for the code block is generated as follows:

```
%0 L= VARIABLE($x ($0), #0)           => %0 => {Null}
%1 R= CALL<3>("getrandmax", %0)       => %1 => {Int}
ASSIGN<=>(%0, %1)                     => %0/$x => {Int}
%2 R= VARIABLE($x ($0), #1)           => %2 => {Int}
%3 L= VARIABLE($y ($1), #2)           => %3 => {Null}
ARRAY_ASSIGN<=>(%3, %2, 10)           => %3/$y => {Array}
%4 L= VARIABLE($z ($2), #3)           => %4 => {Null}
%5 B= VARIABLE($y ($1), #4)           => %5 => {Array}
%6 R= CALL<3>("array_keys", %1, %5)   => %6 => {Null, Array}
ASSIGN<=>(%4, %6)                     => %4/$z => {Null, Array}
%7 R= VARIABLE($x ($0), #5)           => %7 => {Int}
%8 L= VARIABLE($z ($2), #6)           => %8 => {Null, Array}
ARRAY_ASSIGN<=>(%8, %7, 1.5)          => %8/$z => {Array}
%9 L= VARIABLE($z ($2), #7)           => %9 => {Array}
ARRAY_ASSIGN<=>(%9, 0, 1.3)           => %9 => {Array}
%10 L= VARIABLE($w ($3), #8)          => %10 => {Null}
%11 R= CALL<0>("\Helper", %0, %0)     => %11 => {CStr}
ASSIGN<=>(%10, %11)                   => %10/$w => {CStr}
RETURN
```

The return types may be generated by typeflowing according to forward data flow analysis. The process can infer return typesets for both builtin function such as getrandmax( ) and array_keys( ) as well as for user-specified functions such as Helper( ). In this case, getrandmax is known to return {Int}, array_keys returns {Null, Array} and Helper returns {CStr}. The return typeset for Helper( ) may be performed by data flow analysis as described above.

Next, in step 404, location inference is performed for the code block. In one implementation, for all variables, it is determined if location inferences including the backing store and/or access of the backing store (a "location set") may be made for the variable. If so, the location set for the variable is updated (e.g., within a cache). The process is repeated until it converges. Convergence occurs, in some implementations, once all expressions have been analyzed and the forward data flow analysis does not provide any updates to the location set of any variables.

For example, the code block may include the function BasicLocation( ) as follows:

```
function& BasicLocation( ) {
global $x;
$y=$x<<5;
$z=&$x;
$w=&$y;
$w+=3.14;
return $w;
}
```

The forward data flow analysis produces the following CFG, annotated with the results of location analysis:

```
GLOBAL_DECL<1>($x ($0))     => $x => {Global}
%0 L=VARIABLE($y ($1), #0)  => $y => {FuncLocal}
%1 R=VARIABLE($x ($0), #1)  =>
%2 R= BINOP<<<>(%1, 5)      =>
ASSIGN<=>(%0, %2)           =>
%3 L= VARIABLE($x ($0), #2) =>
%4 &= VARIABLE($z ($2), #3) => $z => {Aliased FuncLocal Ref}
ASSIGN_REF<0>(%4, %3)       => $x => {Aliased Global}
                               $z => {Aliased Global Ref}
%5 L= VARIABLE($y ($1), #4) =>
%6 &= VARIABLE($w ($3), #5) => $w => {Aliased FuncLocal Ref}
ASSIGN_REF<0>(%6, %5)       => $y => {Aliased FuncLocal}
%7 L= VARIABLE($w ($3), #6)
%8 R= ASSIGN<+>(%7, 3.14)
%9 L= VARIABLE($w ($3), #7)
RETURN(%9)
```

At the end of the process, $x is determined to have the location set {Aliased Global}, $y is determined to have the location set {Aliased FuncLocal}, $z is determined to have the location set {Aliased Global Ref} and $w is determined to have the location set {Aliased FuncLocal Ref}.

Similar to type inferences, location inferences may be made based on various sources of location information including signature of builtins (e.g., defined location types), return locations computed for user functions, argument locations from call-time function specialization and rules of the language.

In step 405, the type set and location set information generated is stored in association with the code block or a portion thereof (e.g., specific function, variable, expression, etc.). For example, in one embodiment, a function table may store information regarding the determined type set and/or location set information (e.g., within caching module 203). In some examples, the type set and/or location set information may be stored permanently or for a limited time period.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
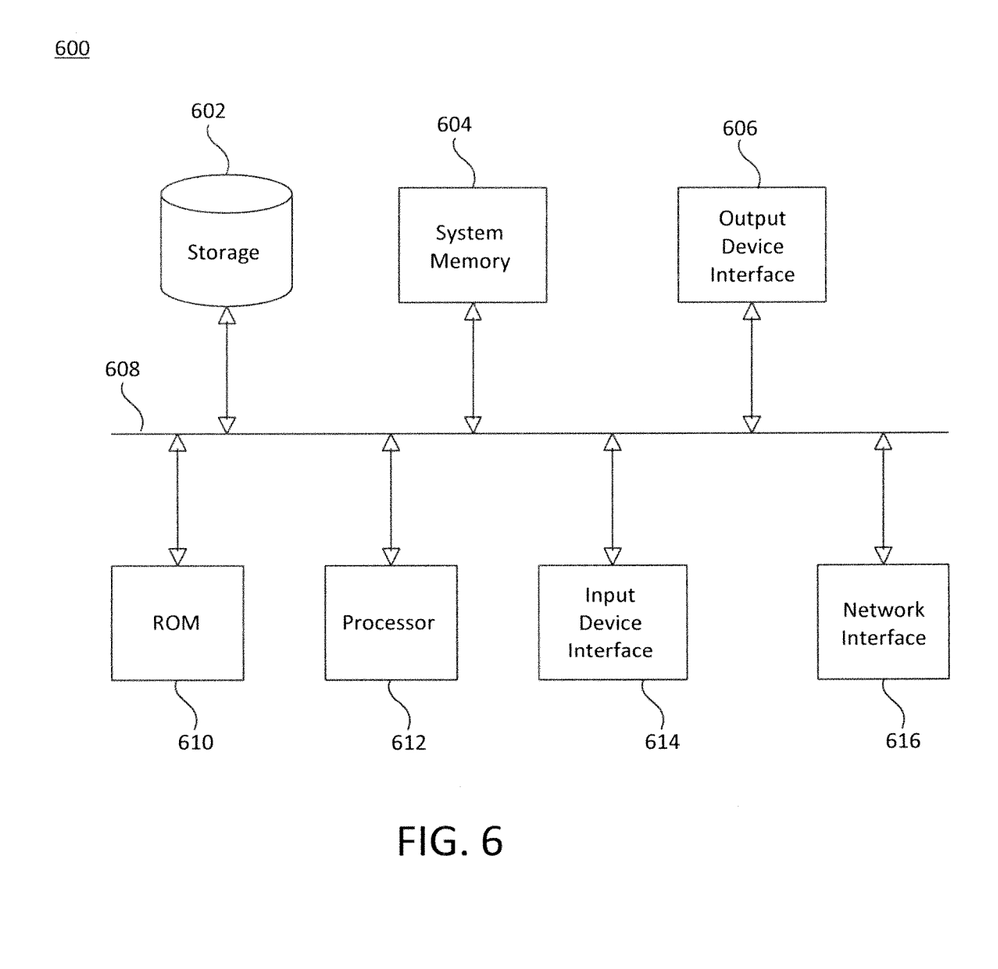
FIG. 6 conceptually illustrates an electronic system with which some implementations of the subject technology are implemented.

FIG. 6 conceptually illustrates an electronic system with which some implementations of the subject technology are implemented. Electronic system 600 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for performing type and location analysis to facilitate optimized generation of machine code at runtime performing type and location analysis to facilitate optimized generation of machine code at runtime according to various implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method comprising:
   receiving a code block of dynamic language code, the code block including one or more variables;
   generating a control flow graph of the code block, the control flow graph including one or more operations;
   performing forward data flow analysis for the control flow graph of the code block, the forward data flow analysis for each operation of the one or more operations of the control flow graph comprising:
      determining if the operation provides an update regarding a type of one or more of the one or more operations or one or more variables, the update being based on one or more rules of type inference, wherein the one or more rules of type inference comprise at least one of: information including a signature of a builtin, a return type computed for a user function, an argument type from call-time function specialization, or a rule of language of the code block;
      updating a type set of each of the one or more operations when the operation provides the update regarding the type of each of the one or more operations, wherein the update regarding the type of at least one of the one or more operations is determined independently of the one or more variables; and
      updating a type set of each of the one or more variables when the operation provides the update regarding the type of each of the one or more variables; and
      returning the type set for the one or more of the one or more operations or the one or more variables of the code block determined in response to the forward data flow analysis, wherein the type set of each of the one or more operations or the one or more variables defines possible types for each of the one or more operations or the one or more variables.

2. The method of claim 1, wherein performing the forward data flow analysis further comprises:
   for each of the one or more operations of the control flow graph, determining if the operation provides an update regarding a scope of the one or more variables, the update being based on one or more rules of location inference; and
   updating, prior to executing the code block, a location set of each of the one or more variables where the operation provides the update regarding the scope of the one or more variables, wherein the location set for each variable of the one or more variables is initially set to null and the location set comprises one or more possible locations for the variable.

3. The method of claim 2, further comprising:
   returning the location set for each of the one or more variables of the code block determined in response to the forward data flow analysis once the forward data flow analysis converges.

4. The method of claim 2, wherein the rules of location inference include one or more of: information regarding signatures of builtins, return locations computed for user functions, argument locations from call-time function specialization or rules of language of the code block.

5. The method of claim 2, wherein the location set for at least one of the one or more variables includes at least two possible locations.

6. The method of claim 2, wherein the location set for at least one variable of one or more variables includes location information regarding type of storage for the at least one variable.

7. The method of claim 6, wherein a type of storage for the at least one variable may include one of stack based, heap based, global heap or constant.

8. The method of claim 2, wherein the location set for at least one variable of one or more variables includes location information indicating type of access for the at least one variable at runtime.

9. The method of claim 8, wherein the type of access comprises at least one of: statically resolving an address during compile-time, semi-statically resolving the address with occasional feedback to dynamic lookup, dynamically resolving with pre-computation, or fully dynamically resolve by name.

10. The method of claim 2, further comprising:
storing the type set for the one or more of the one or more operations or the one or more variables in association with the code block once the forward data flow analysis converges.

11. The method of claim 1, wherein the code block includes a function, and wherein the returning comprises returning type information regarding one or more argument variables or return variables of the function.

12. The method of claim 1, wherein the forward data flow analysis is performed until the forward data flow analysis converges.

13. The method of claim 1, wherein the code block is in a dynamic language.

14. A system comprising:
one or more processors; and
a machine-readable medium comprising instructions stored therein, which when executed by the processors, cause the processors to perform operations comprising:
generating a control flow graph of a code block, the control flow graph comprising one or more operations and one or more variables;
performing forward data flow analysis for the code block until the forward data flow analysis converges, the forward data flow analysis for each operation of the one or more operations of the control flow graph comprising:
determining if the operation provides an update regarding a type of one or more of the one or more operations or one or more variables, the update being based on one or more rules of type inference, wherein the one or more rules of type inference comprise at least one of: information including a signature of a builtin, a return type computed for a user function, an argument type from call-time function specialization, or a rule of language of the code block;
updating a type set of each of the one or more of the one or more operations or one or more variables where the operation provides the update regarding the type;
determining if the operation provides an update regarding a scope of the one or more variables, the update being based on one or more rules of location inference; and
updating, prior to executing the code block, a location set of each of the one or more variables where the operation provides the update regarding the scope of the one or more variables; and
storing the type sets and location sets generated in response to the forward data flow analysis with respect to the code block.

15. The system of claim 14, wherein the forward data flow analysis converges when the location set and type set of the one or more operations or one or more variables is no longer updated.

16. The system of claim 14, wherein the location set for at least one variable of one or more variables includes one or more of: location information indicating how optimally to represent a type of storage for the at least one variable, or location information indicating type of access for the at least one variable at runtime.

17. A non-transitory machine-readable medium comprising instructions stored therein, which when executed by a machine, cause the machine to perform operations comprising:
receiving a code block, the code block including one or more variables;
generating a control flow graph of the code block including one or more operations;
performing forward data flow analysis for the control flow graph of the code block, the forward data flow analysis for each operation of the one or more operations of the control flow graph comprising:
determining if the operation provides an update regarding a type of one or more of the one or more operations or one or more variables, the update being based on one or more rules of type inference, wherein the one or more rules of type inference comprise at least one of: information including a signature of a builtin, a return type computed for a user function, an argument type from call-time function specialization, or a rule of language of the code block;
updating a type set of each of the one or more of the one or more operations or one or more variables where the operation provides the update regarding the type;
determining if the operation provides an update regarding a scope of the one or more variables, the update being based on one or more rules of location inference; and
updating, prior to executing the code block, a location set of each of the one or more variables where the operation provides the update regarding the scope of each of the one or more variables; and
returning the type set for each of the one or more of the one or more operations or the one or more variables of the code block determined in response to the forward data flow analysis, wherein the type set of each of the one or more operations or the one or more variables defines possible types for each of the one or more operations or the one or more variables.

18. The non-transitory machine-readable medium of claim 17, wherein performing the forward data flow analysis further comprises:
determining if the forward data flow analysis converges, wherein the forward data flow analysis converges when the location set and type set of the one or more operations or one or more variables is no longer updated;
performing the forward data flow analysis if the forward data flow analysis does not converge; and
storing the type sets and location sets generated in response to the forward data flow analysis with respect to the code block.

* * * * *